Dec. 22, 1964 R. R. SCHLAICH 3,162,789
AMPLIFYING DEVICE
Filed April 17, 1961 3 Sheets-Sheet 1

INVENTOR
Robert Schlaich
BY George H. Spencer
ATTORNEY

Dec. 22, 1964   R. R. SCHLAICH   3,162,789
AMPLIFYING DEVICE

Filed April 17, 1961   3 Sheets-Sheet 2

INVENTOR
Robert Schlaich

BY Georgett Spencer
ATTORNEY

Dec. 22, 1964  R. R. SCHLAICH  3,162,789
AMPLIFYING DEVICE

Filed April 17, 1961  3 Sheets-Sheet 3

INVENTOR
Robert Schlaich

BY George H. Spencer
ATTORNEY

United States Patent Office 3,162,789
Patented Dec. 22, 1964

3,162,789
AMPLIFYING DEVICE
Robert Roy Schlaich, Robert Bosch-Strasse 103,
Stuttgart, Germany
Filed Apr. 17, 1961, Ser. No. 103,585
Claims priority, application Germany, Apr. 22, 1960,
Sch 27,784
16 Claims. (Cl. 317—124)

The invention relates to a device for amplifying a measured value of a magnitude, as represented by the position of an indicator, and for actuating a measured actual value switching member of a control device, the adjusting forces of this actual value switching member being supplied by a servomotor controlled by the indicator.

Switching apparatus called controllers are preferably used for carrying out certain operational processes and for keeping predetermined operational values constant, for example, temperature. These controllers, upon a change of the amplitude of an input signal supplied by an actual value sensing element, bring about a corresponding change of amplitude of an adjusting signal. The electric value measured, supplied by actual value sensing elements arranged at suitable places in the plant, for example, resistance thermometers or thermocouples, is so small as regards its energy that for indicating actual value variations measuring instruments with a small internal consumption have to be used, preferably moving-coil measuring instruments.

Therefore, in such a controller there is first of all a sensitive indicating system, the position of an indicator representing the actual value of a magnitude. According to the basic principle of control, however, the actual value of the magnitude should correspond as accurately as possible to a predetermined theoretical or desired value and in the case of deviations between the two values switching operations have to be initiated which influence the amplitude of an adjusting signal in such a way as to bring the deviating actual value to the predetermined desired value. In general, the small energy of the input signal of the controller, supplied by the electric actual value sensing elements, does not permit the coupling of contact devices directly with the indicator of the indicating system and thereby to initiate switching operations for influencing the adjusting members. It is therefore necessary to supply the forces required for starting the switching operations by an additional source of power outside the indicating system, for example, by a servomotor. The most essential task in the designing of controllers consists in creating an expedient control device which causes the forces of the servomotor to become active in starting the switching operations according to the position of the indicator in the indicating system. This operation may be considered as an amplification of the magnitude of the measured value since the energy of the servomotor, considerably increased as compared to the amplitude of the input signal, is controlled by the amplitude of the input signal.

In the known embodiment of a pressure-stirrup controller, a pressure stirrup driven by the servomotor periodically senses the pointer position of an indicating system. This pressure stirrup, when a sheet-metal sensing element connected with it strikes upon a sensed element fastened to the pointer, moves through a path which deviates when compared to the movement possible by a free displacement of the sheet-metal sensing element without abutment against the pointer-fixed sensed element. The sheet-metal sensing element is displaced according to the position of the amplitude of the desired value, and the course of motion as changed by the abutment of the sensed element occurs when the pointer of the indicator system proceeds into the range of the sheet-metal sensing element, that is, when the actual value reaches the set desired value or is about to exceed it. Such an overshooting of the desired value, wherein the pointer-fixed sensed element could possibly again get out of the range of the sheet-metal sensing element, is prevented by an appropriate stop at the sheet-metal sensing element. This stop causes the sensed element to influence the course of motion of the pressure stirrup until such time as the actual value reaches or exceeds the set desired value. The differences in the courses of motion of the pressure stirrup may actuate a mercury toggle switch which takes over control of the operational value to be influenced, for example, a step-wise switching off of an electric heating device, if necessary with interposition of control relays. Also, the known chopper bar controllers are designed in a way similar to the described pressure-stirrup controller, and use the displacing forces of an adjusting motor for driving a chopper bar which can bring about a switching motion only if a pointer-fixed sensed element interposes for assisting the course of motion, and this occurs only if the actual value gets into the range of the desired value or exceeds it.

The described known means, representing an electromechanical amplification of the measured value amplitude influencing a sensitive indicating system, have the essential drawback that the pointer of the indicating system cannot swing out freely over the indicating scale but is clamped fast by sensing elements within short intervals of time. This results in undesirable bending forces being created, even with the use of relatively long and elastic pointers, which in the long run injuriously influence the support of the movable part of the indicating system, for example of the moving coil. Especially if there are very small input-signal amplitudes necessary, there is no possibility of mounting a relatively long pointer insensitive to continued mechanical influence.

In addition, there are known measured value amplifiers wherein the small value to be measured, supplied by a measured value sensing element, may be amplified to a proportional electric value. A known embodiment uses a galvanometer-like indicating system which, when the input signal is applied, influences, through a revolving mirror, one of two inversely connected photoelectric cells. Additional electronic means then bring about a compensation balancing in the circuit in such a way as to make the voltage drop of a compensating resistance equal to the input voltage supplied. Instead of the photoelectric amplifier described, a so-called oscillating circuit amplifier is used in practice for amplifying the input signal, in which a shielding flag is mechanically connected with the movable part of the indicating system. The shielding flag is disposed in the air gap between two inductively coupled coils of an oscillator stage, thereby influencing its anode current. Both the known photoelectric amplification and the oscillating circuit amplification of the input signal cannot completely satisfy for the purposes of practical operation. Above all, the sensitivity of these instruments to rough operational conditions as well as the relatively high expenditure of electrical switching means proves disturbing.

With these defects of the prior art in mind, it is an object of the present invention to provide a controller wherein the actual value indicator or pointer may move along the indicating scale unhindered.

Another object of the invention is to provide a device of the type described which will function properly even when subjected to rough operating conditions.

A further object of the invention is to provide a control instrument wherein the electric control means is arranged at the position of the actual value indicator rather than at the element representing the desired value as in the prior art, which results in a simple controller design which is insensitive to operational influences.

Yet a further object of the invention is to provide a relatively simple and inexpensive device yet one which is exceedingly effective for the purpose for which it is designed.

The invention overcomes the difficulties of the prior art and has a servomotor which periodically moves a mechanical follow-up assembly into two positions one substantially at the momentary position of the indicator and the other to one side thereof by electric control means arranged at this follow-up assembly. The electric control means are in turn controlled by a shielding element mechanically connected with the indicator, and cooperating with a light source and a photoelectric device to initiate change-over impulses for changing the direction of rotation of the servomotor. Further, the measured or actual value, amplified for starting a switching operation, is picked up from the mechanical follow-up assembly. Thus, in this case, too, there is an electromechanical amplification of the input signal, the embodiment of the invention differing from the known photoelectric amplification devices by, inter alia, the electric control means, for example, a photoelectric cell or a photo-resistance cell, being arranged, not as before at the element representing the desired value, but at a follow-up assembly oscillating around the position of the indicator (actual value). This design offers considerable advantages, making possible an especially simple controller design insensitive to operational influences. With the control mechanism used, the follow-up assembly follows the position of the indicator with the considerable adjusting force supplied by the servomotor, so that now there is an amplified actual value which may actuate, for example, a potentiometer-like sliding contact of a continuous controller. The novel device accomplishes an amplification of the input signal without influencing or mechanically burdening the sensitive indicating system in any way, and moreover, obviating the problem of falsification of the measured or actual value frequently occurring in known controllers. In general, it is advantageous to arrange indicator and follow-up assembly in such a way that the two axes of rotation lie on a common center line.

In an advantageous embodiment, the follow-up assembly is a swivel arm drivable by the servomotor, which swivel arm carries a source of light and a coordinated photo-resistance cell as the electric control means. If desired, a photoelectric cell may take the place of the photo-resistance cell. For achieving a sufficient sensitivity of response, according to a further development of the invention, a photoelectric element is arranged behind a diaphragm with a longitudinal slit extending radially to the direction of motion of the swivel arm, which diaphragm is covered by a plate-shaped cover element or is exposed to the passage of light from the light source.

It may, in addition, be advisable to provide a stoppiece for the cover element at the follow-up assembly or the swivel arm in such a way that there can be no control of the reversal of the direction of rotation of the servomotor by an overshooting of the cover element fastened to the indicator due to a sudden increase of the value to be measured. In an embodiment of the invention with a thermocouple as the actual value sensing element, tested by practical application and considered advantageous, the circuit of the servomotor is so arranged that the latter displaces the swivel arm toward higher measured values when the surface of the photoelectric cell is covered by the cover element, while it carries out a swivelling motion toward the zero point of the pointer when the surface is exposed.

In operating the controller without special precautionary measures, serious faulty control operations may be carried out if, for example, the indicating system becomes currentless by wire breakage in the supply lines to the actual value sensing element and returns to its zero position, or if the incandescent lamp arranged for operating the photoelectric cell blows out. In case of wire breakage, the follow-up assembly would follow the actual value pointer to the zero position, thereby influencing the amplitude to the adjusting signal in an undesirable manner not corresponding to actual conditions. If the source of light is eliminated, on the other hand, a faulty control operation would occur in the opposite direction due to the fact that the follow-up assembly would be moved to an extreme terminal position, because of the control by darkness no longer caused by the cover element. This could cause damage of the entire mechanical device because of the great mechanical displacing forces. Therefore, to avoid these occurrences, in a further development of the invention, contacts that can be actuated by the follow-up assembly are provided at the beginning and/or the end of the measuring range swept by the measuring element. These contacts initiate, for example in the zero terminal position, a corresponding influencing of the adjusting signal (interruption of the heating) with a simultaneous danger signal, and a similar safety switching operation in the maximum deflection terminal position. The extreme operational conditions occurring thereby are preferably made visible by appropriate warning lamps arranged in the scale of the controller.

For driving the follow-up assembly, an A.C. or D.C. motor may be used. For compensating for the differing numbers of revolutions, preferably a worm drive is used between servomotor and swivel arm, which brings about a considerable power transmission at the same time. It may, in addition, be preferable, if a moving coil or D.C. motor is used, to make its number of revolutions adjustable, whereby the course of the control operation may be influenced within certain limits. Preferably, the follow-up assembly carries a contact piece which touches a contact arm, rigidly coupled with the desired value pointer, for contacting. In addition, this contact arm may be bimetallic so that it may be displaced by a lead angle with regard to the desired value pointer by a heating coil arranged on it, this lead angle being variable by the adjustment of means, connected in the circuit of the heating coil, for varying the heating amperage. Especially in this adjustment of a lead angle with regard to the desired value with use of a contact arm of bimetal, the application of the invention proves itself substantially advantageous because hereby an actual value contact with large contact forces is available, making possible a satisfactory switching operation although the energy of the input signal would in no way be sufficient for such a switching movement, especially in the case of resistance thermometers and thermocouples.

A modified embodiment of the controller may be realized in an advantageous manner by having the follow-up assembly carry a contact piece which is part of a continuous control device, for example the tapping arm of a potentiometer. In this way, the amplitude of an adjusting signal may be continuously varied within the adjusting range.

Instead of a thermocouple as an actual value sensing element, a so-called "thermistor" may be used, that is, a temperature-variable resistance with a negative temperature coefficient. Preferably, this thermistor is connected as a bridge resistance of a known bridge circuit, the indicating system of the controller lying in the diagonal of the bridge indicator. Preferably, the bridge is supplied by an additional source of direct voltage.

With an appropriate choice of the bridge resistances, an advantageous course of the scale of the indicating system may be achieved, the scale values being stretched in the range of the theoretical value to be controlled, while the regions of the scale values not needed for the reading appear compressed. It is advisable to dimension the bridge in such a way that the zero value of the magnitude to be measured is coordinated with the maximum deflection of the pointer, that is to say, the bridge is most strongly detuned at the zero value of the magnitude to be measured, this detuning continuously decreasing with increasing actual value.

Moreover, it may be advisable to provide one or several additional contacts in the range of the actual value contact part, which contacts, when the desired value of the magnitude to be measured is exceeded, influence corresponding amplitudes of control signals which in their action are directed opposite to the original control signal. If, for example, the controller switches in an electric heating device, the additional contacts may temporarily set in motion a cooling device when the desired value of temperature is exceeded.

Additional objects and advantages of the present invention will become apparent upon consideration of the following description when taken in conjunction with the accompanying drawings in which:

FIGURE 3a is a fragmentary diagrammatic view of an alternative construction;

FIGURE 5 is a fragmentary perspective view of the mounting of the contact carrier for the actual value contact.

Figure 1:
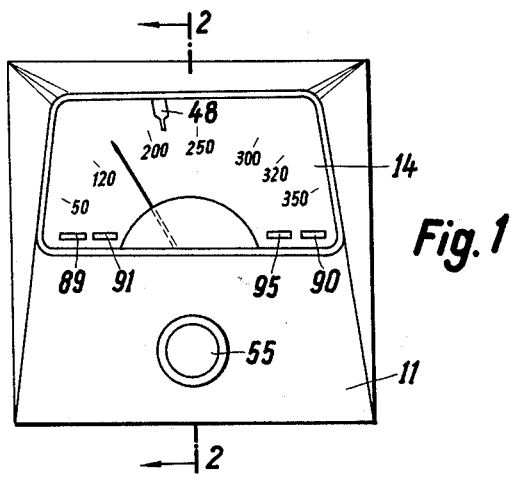
FIGURE 1 is a front elevation of a controller with an amplification device according to the invention.
Figure 2:
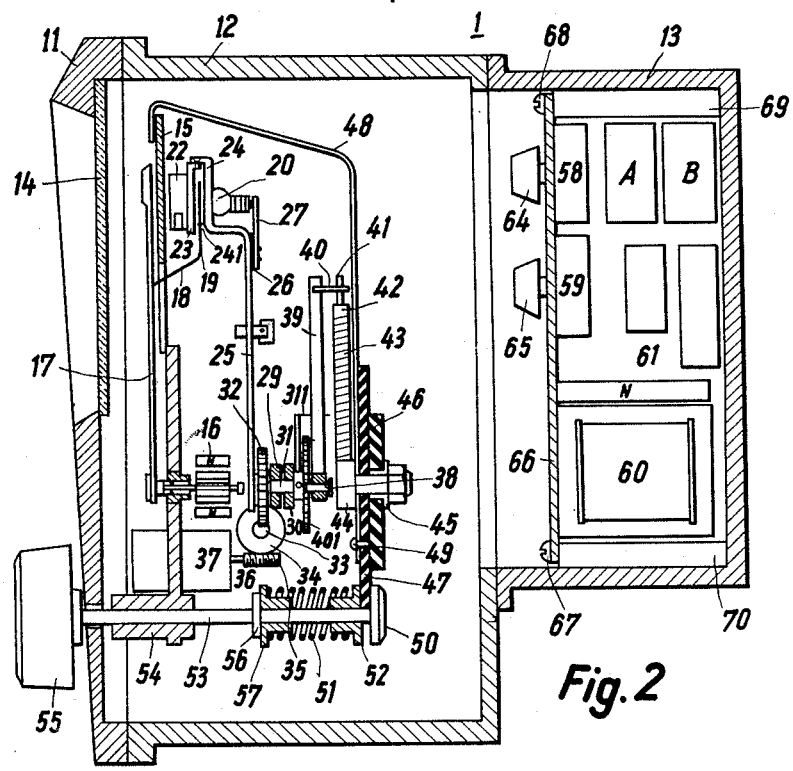
FIGURE 2 is a longitudinal section taken substantially along the plane defined by line 2—2 of FIGURE 1.
Figure 3:
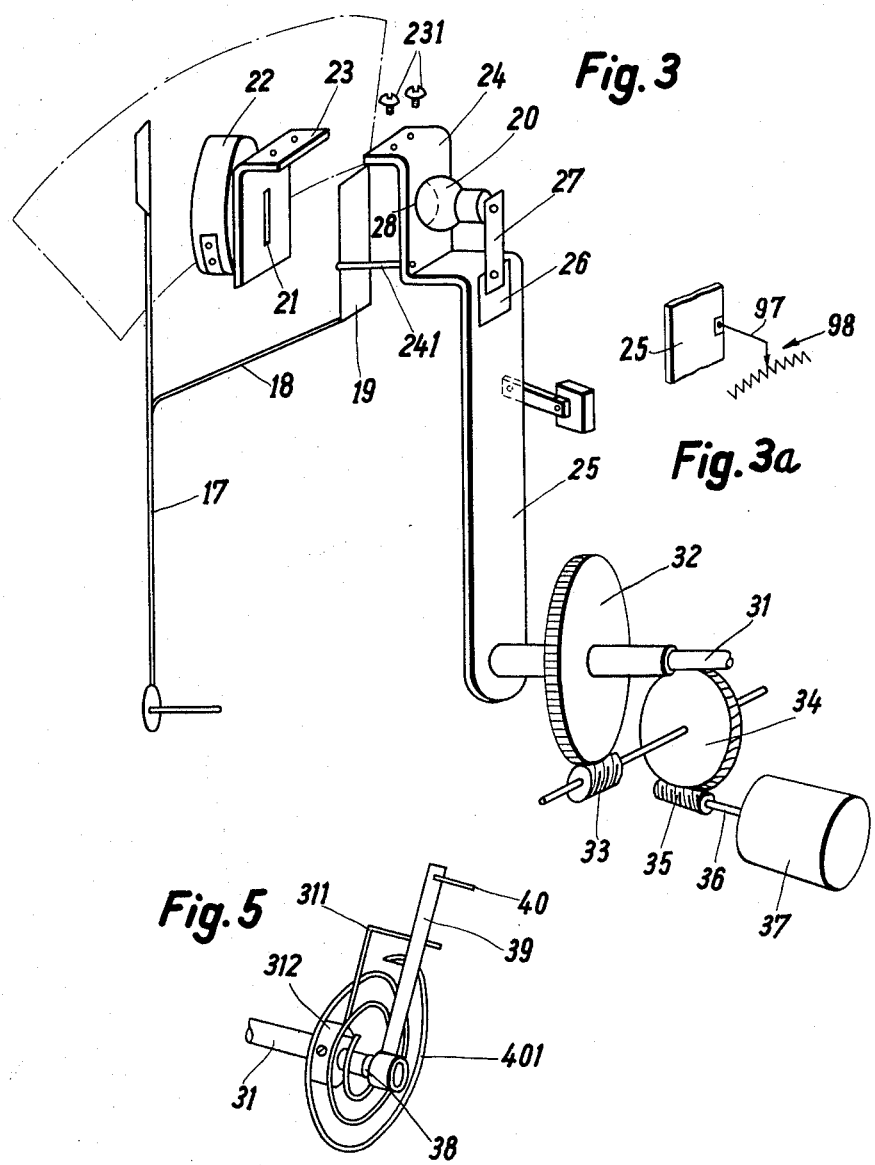
FIGURE 3 is a perspective view of the follow-up section of a photoelectric control in the controller according to FIGURE 1.

FIGURES 1 and 2 show a controller housing 1 composed of a front plate 11, a central part 12, and a box shaped part 13. In the front part, a glass plate 14 is inserted in a corresponding recess permitting a view of a scale 15 lying behind it. In front of this scale 15, a pointer 17, connected with a moving coil measuring system 16, is arranged which serves for indicating the actual value of the magnitude to be measured. The pointer 17 carries, in addition, a cover plate 19 mounted thereon by an angle plate 18. The cover plate, depending upon the position of the pointer, enters the light path between an incandescent lamp 20 and a photo-resistance cell 22 arranged behind a slit shaped longitudinal diaphragm (cf. FIGURE 3). The photo-resistance cell 22 is fastened to a holding part 23 which in turn is connected by screws 231 with a fastening part 24 of a swivel arm 25. At the swivel arm 25, a contact strip 27 of springy material is fastened to an insulating piece 26, which contact strip presses the incandescent lamp 20 against a recess 28 of the fastening part 24, thereby fixing it in its position. The swivel arm 25 is fixed to swivel shaft 31 which is supported in bearing pieces 29, 30. The swivel shaft 31 may be driven by a first worm 33 by means of a gear wheel 32 with a stationary axis, the first worm 33 being driven in turn by a second drive worm 35 through a worm gear wheel 34, which latter drive worm in arranged on the drive shaft 36 of a moving-coil motor 37.

At the swivel shaft 31 (cf. also FIGURE 5) there is a cylindrical support piece 38 to which a contact carrier 39 of the actual value contact piece 40 is rotatably fastened, with interposition of a helical spring 401, against spring action. In addition, a toggle lever 311 is non-rotatably arranged on the swivel shaft 31 by means of an adjusting ring 312, against which toggle lever the contact carrier 39 abuts under the action of the helical spring 401. The desired value contact 41 is disposed on a bimetal strip 42, wrapped with a heating coil 43 and non-rotatably connected with an adjusting piece 44. The adjusting piece 44 is journalled in a hollow shaft 45 on a holding bracket 46. A desired value pointer 48, connected with an adjusting disk 47, also participates in the rotary motion of the adjusting piece 44. The adjusting disk 47, which is connected with the desired value pointer 48 by a rivet joint 49, may be displaced, by means of a thumb wheel 55, by a friction drive, formed of an adjusting disk 50 and a sliding sleeve 52 under the action of a spring 51, through a shaft 53 supported in a holding piece 54. A sleeve shaped spring abutment 57 held by a spring ring 56, serves as outer support for the compression spring 51, which spring abutment, just as the sleeve 52, is displaceably arranged on the shaft 53 with a rotatable connection.

Figure 4:
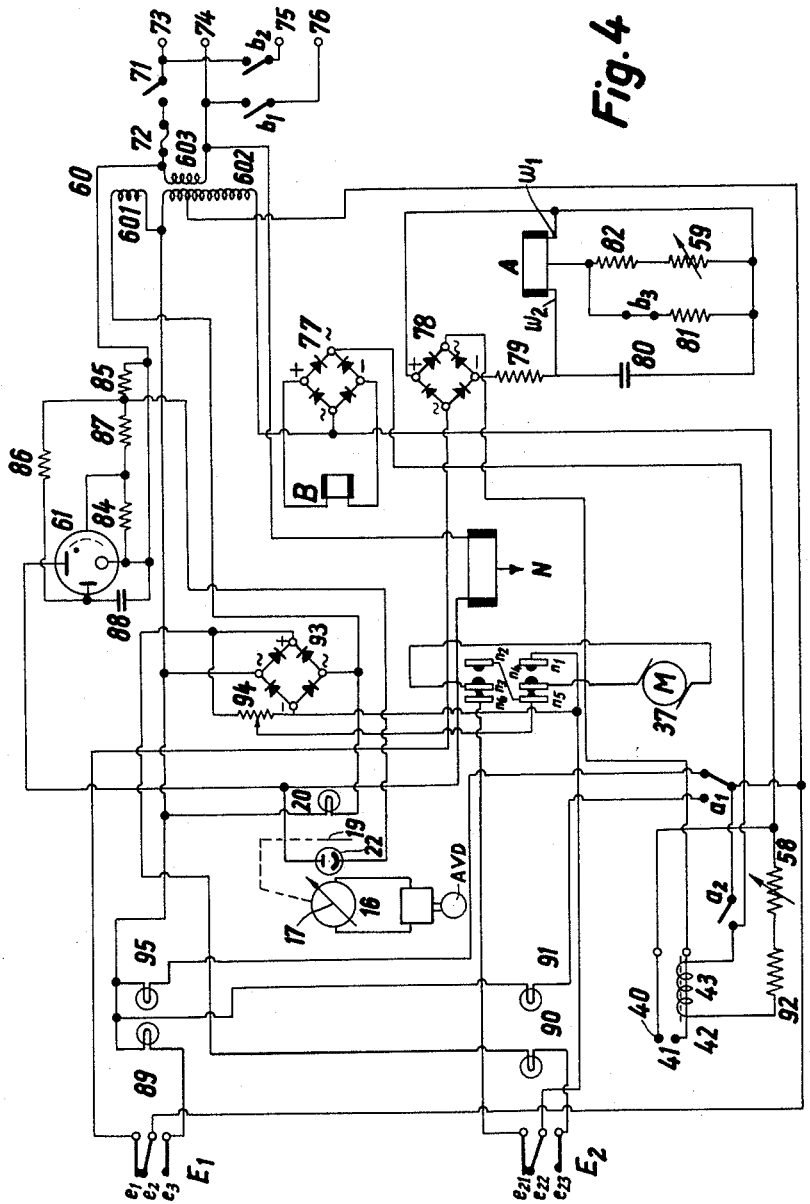
FIGURE 4 is a wiring diagram of the controller according to FIGURES 1 and 2.

In the box shaped housing part 13, adjustable resistances 58, 59 may be seen, which serve for the step and impulse control, according to the wiring diagram shown in FIGURE 4. In addition, a power line transformer 60, as well as a switching tube 61 and the switching relays A, B, are at this point. A further relay for controlling the reversal of the direction of rotation of the D.C. motor 37 is designated with N.

Thumb wheels 64, 65 of the control resistances 58, 59 are on the front side of a holding plate 66, which is fastened by means of screws 67, 68 at the holding arm 69, 70, produced in one piece with the pressed plastic parts of the housing. For reasons of clarity, the sectional drawing according to FIGURE 2 does not contain the wiring of the individual circuit elements and contact parts. For this purpose, reference is made to the circuit diagram according to the wiring diagram of FIGURE 4.

Starting from the wiring diagram in FIGURE 4, a power line transformer 60 is shown, carrying secondary windings 601, 602 as well as a primary winding 603. With interposition of a toggle switch 71, the primary winding 603 may be put directly at the input terminals 73, 74 of the power line through a fuse 72. The input voltage of the power line is likewise applied at the output terminals 75, 76 when contacts $b_1$, $b_2$ are closed such as when, in the course of the switching operation of the controller, the relay B is energized by the closing of the contact $a_2$ which is actuated by the relay A. Before being supplied to the relay B, the alternating voltage supplied by the power line transformer 60 is converted into direct voltage by a first full wave rectifier of the so-called Graetz type 77. The relay A, provided in known manner with a working winding $W_2$ and a holding winding $W_1$, obtains voltage through a second Graetz rectifier 78. When the second rectifier 78 is supplied with alternating voltage, a direct current flows through the windings $W_1$ and $W_2$ through a series resistance 79, which at the same time is connected in series with a capacitor 80. Series connections of the wiping contact $b_3$, actuated by the relay B, with a resistance 81, as well as those of a resistance 82 with a control resistance 59, which serves for the impulse control, are put in parallel connections at the center tap between the windings $W_2$ and $W_1$. The reversal of the motor 37 is done by pole reversal through the contacts $n_1$, $n_2$, $n_3$, $n_4$, $n_5$, and $n_6$, of the power line relay N. The power line relay N, at whose winding the line voltage is applied through the switching tube 61 when the photo-resistance cell 22 is exposed to the light, thereby effects the reversal to the direction of rotation. For obtaining the necessary opertional data of the switching tube 61, series resistances 84, 85, 86, and 87 as well as a by-pass capacitor 88 are provided.

The terminal switches $E_1$ and $E_2$ are actuated by the swivel arm 25 in its two extreme positions. The terminal switch $E_1$, which is actuated in the case of a defect of the indicating system or in the case of a breakage in the wire to the actual value sensing element, switches in a warning lamp 89, while the terminal switch $E_2$, which is actuated in the case the light barrier or the switching tube 61 is eliminated, causes a further warning lamp 90 to light up.

A red control lamp 91 indicates the switched-in state of the adjusting signal, a green control lamp 95 its switched-off state. The contacts $a_1$ and $a_2$ are controlled by the relay A. The motor 37 is supplied through a further Graetz rectifier 93 from the winding 691 of the power line transformer 60. The voltage share of the motor 37 may be established by an adjusting potentiometer 94. The incandescent lamp 20 is likewise supplied directly from the winding 601 of the power line transformer 60. The change-over contact $a_1$ of the relay A switches in, in each case, the green or the red control lamp 95, 91 thereby indicating the operational state of the device connected with the controller, for example of the heating coil. When the adjusting signal is switched in, that is, when the contact $a_2$ is opened, the red control lamp 91 is caused to light up by the changeover contact $a_1$.

In the following, the mode of operation of the switching arrangement shall be illustrated with reference to the object of the invention. It is assumed first that, when the controller is switched in, the actual value of the magnitude to be measured lies below the desired value, so that the cover plate 19, moved by the pointer 17 of the measuring system 16, abuts against the stop pin 241 of the holding part 24. The stop pin 241 is of essential importance, because it prevents an overshooting of the cover plate 19 in case of a sudden increase in the actual value, which overshooting would lead, after an initial darkening of the slit diaphragm 21, to a renewed exposure to light and thereby to a movement of the swivel arm 25, connected with the actual value contact, running completely counter to the operational conditions. When the cover plate 19 is at the stop pin 241 and the slit diaphragm 21 is thus blocked off from the light from the incandescent lamp 20, the motor 37 rotates in such a way that the swivel arm moves from the region of the zero position of the scale towards higher scale values. When, in doing so, the actual value finally slightly exceeds the set desired value, the cover plate 19 lags behind the process of motion of the slit diaphragm 21 which is connected with the swivel arm 25 through appropriate intermediate members, and this diaphragm is illuminated by the incandescent lamp 20, a photoelectric effect being thereby produced at the photo-resistance cell 22 lying behind it.

The switching tube 61 then switches in and produces an electrically conductive connection between the anode and the cathode so that the line voltage is applied at the winding of the power line relay N and the switch contacts $n_3$, $n_4$ now come to abut against the stationary contacts $n_1$, $n_2$. This causes a pole reversal of the motor 37 with regard to the Graetz rectifier 93 which serves as source of electromotive force, and the swivel arm 25 now initiates an inverse rotary motion in the direction toward the zero point of the scale. After a small path of, for example, 0.5° by the swivel arm 25, however, the photo-resistance cell 22 is darkened anew by the cover plate 19 so that the electrically conductive connection between anode and cathode of the switching tube 61 stops, the power-line relay N becoming currentless. The movable switch contacts $n_3$, $n_4$ again assume the position at the stationary contacts $n_5$, $n_6$ shown in the drawing and the servomotor 37 reverses its direction of motion anew. This causes a swinging of the swivel arm 25 in the narrow region around the actual value position of the actual value pointer 17. When the actual value contact 40 detaches itself from the set desired value contact 41, which latter, if necessary, is varied with a lead by the heating of the heating coil 43, the retarded relay A is released, after the retardation time set by the RC section (79, 80) has elapsed, and reverses the contacts $a_1$ and $a_2$ coordinated with it. This causes the relay B to be released also, through the switch contact $a_2$, the relay B opening the operating contacts $b_1$ and $b_2$, and thereby interrupting the operating circuit at the terminals 75, 76. If, for example, a heating device of a liquid tank is connected with the terminals 75, 76 and if under the influence of the heating, the temperature value in the liquid, ascertained by an actual value sensing element, exceeds the set desired value, the heating action is switched off according to the switching operation described until, after a corresponding lowering of the temperature, the control operation repeats itself anew.

In such an arrangement a thermocouple or thermistor could be used as the actual value detector (AVD).

When by an elimination of the instrument or by a break in the supply lines to the actual value sensing element, the swivel arm 25 reaches the terminal switch $E_1$, its central contact $e_2$ is detached from its abutment against the contact $e_1$ and put against the contact $e_3$. This causes the relay A to become currentless, independent of the position of the actual value contact 40 with respect to the desired value contact 41, and the switch contacts assume the position shown in FIGURE 4, wherein the operating current at the terminals 75, 76 is interrupted by the opened contacts $b_1$, $b_2$. By the connection between the central contact $e_2$ and the contact $e_3$, the warning lamp 89 is at the same time put under the partial voltage of the winding 602 of the transformer 60 and lights up, thereby indicating the state of trouble.

If, because of damage to the incandescent lamp 20 or the switching tube 61, the motor 37 has been continuously set in motion in the direction towards the maximum value of the scale, the swivel arm 25, in the region of the scale end, hits against the terminal switch $E_2$ and puts the central contact $e_{22}$ of the latter on the contact $e_{23}$, thereby severing the connection between the central contact $e_{22}$ and the contact $e_{21}$. Moreover, voltage from the additional Graetz rectifier 93, which is provided as a supply for the motor is applied, through the switch contact $e_{23}$, to the warning lamp 90, causing it to light up. This interrupts any further voltage supply to the moving-coil motor 37. The value of the direct voltage available to the lamp 90 corresponds about to that of the alternating voltage supplied by the winding 601 of the transformer 60.

In the embodiment of FIGURE 3a the contacts 40 and 41 are replaced by a tapping arm 97 of a potentiometer 98 mounted on the swivel arm 25 so that the amplitude of an adjusting signal may be continuously varied within the adjusting range. The circuit for use with such an embodiment may be arranged as desired.

It will be understood that the above description of the present invention is susceptible to various modifications, changes, and adaptations, and the same are intended to be comprehended within the meaning and range of equivalents of the appended claims.

What is claimed is:

1. In a device for amplifying a measured value of a magnitude as represented by the position of an indicator, for actuating an actual value switching member of a control device, the adjusting forces of the actual value switching member being supplied by a servomotor controlled by the indicator, the improvement comprising: electrical control means, a mechanical follow-up assembly periodically moved by the servomotor for following the position of the indicator by moving between two positions, one substantially at the position of the indicator and the other to one side thereof by the electrical control means arranged at this follow-up assembly, the electric control means controlling the servomotor and being controlled by a shielding element mechanically connected with the indicator, thereby starting change-over impulses for changing the direction of rotation of the servomotor, and the measured value, amplified for starting a switching operation, being picked up from the mechanical follow-up assembly.

2. A device for amplifying the actual value of a magnitude as represented by the position of an indicator for actuating the switching means of a control device, comprising, in combination: an indicator; a follow-up assembly mechanically independent of said indicator; a servomotor for continuously oscillating the follow-up assembly alternatively to one side of said indicator and then at least to the indicator; electric control means determining the relative positions of the indicator and the follow-up assembly and controlling the servomotor accordingly, said means including a shielding element mechanically connected with the indicator, and an electric circuit mechanically free of the indicator and the shielding element; and means on said follow-up assembly for energizing and deenergizing a relay for actuating and deactuating the switching means of a control device depending upon the position of the follow-up assembly.

3. The device of claim 2, wherein said indicator and said follow-up assembly are rotatable about axes which coincide.

4. The device of claim 2, wherein said electric circuit includes a light source and a photo-sensitive element mounted on said follow-up assembly.

5. The device of claim 4, comprising a diaphragm covering said photo-sensitive element and having a longitudinal slit extending radially of the direction of movement of the follow-up assembly, said shielding element periodically preventing light from the light source from passing through the slit in said diaphragm.

6. The device of claim 2, comprising a stop member on the follow-up assembly for engagement with the shielding element on the indicator for preventing reversal of the servomotor due to an overshooting of the shielding element on the indicator due to a sudden increase of the value to be measured.

7. The device of claim 4, wherein said electric control means controls the servomotor to displace the follow-up assembly in the direction of higher measured values when the shielding element covers the photo-sensitive element and in the direction of lower measured values when the photo-sensitive element is exposed.

8. The device of claim 7, wherein said circuit includes contacts at each end of the measuring range and in the path of the follow-up assembly, one of the contacts when engaged by said assembly deenergizing said servomotor and the other of said contacts when engaged by said assembly deenergizing the relay means to cease the operation of the control device.

9. A device for amplifying the actual value of a magnitude as represented by the position of an indicator for actuating the switching means of a control device, comprising, in combination: an indicator; a follow-up assembly mechanically independent of said indicator; electric control means; a servomotor controlled thereby for oscillating said assembly with respect to said indicator to aid the electric control means in determining the position thereof; said control means including an electric circuit mechanically free of the indicator and including a light source and a photo-sensitive element spaced therefrom, a shielding element mounted on said indicator and movable in a path with respect to said follow-up assembly which passes between said light source and said photo-sensitive element to aid the electric control means in determining the position of the follow-up assembly with respect to the indicator; a stop member on said follow-up assembly for engaging and thereby preventing the indicator from moving farther up the scale to higher values than said follow-up assembly, the shielding element covering the photo-sensitive element when it engages the stop member; said electric control means controlling the servomotor to displace the follow-up assembly in the direction of higher measured values when the shielding element covers the photo-sensitive element and in the direction of lower measured values when the photo-sensitive element is exposed, a pair of desired value contacts in said circuit, one being movable by the follow-up assembly for deactuating the normally actuated switching means of a control device.

10. The device of claim 9, wherein said other desired value contact is mounted on a bimetal strip having a heating coil, whereby said other contact may be displaced as desired by varying the amperage in the heating coil, said movable contact being resiliently mounted for engaging the other contact while the follow-up assembly oscillates.

11. The device of claim 9, wherein said pair of contacts are part of a continuous electric control device or potentiometer.

12. The device of claim 9, comprising a thermistor acting as an actual value sensing element to control said indicator.

13. The device of claim 9, comprising a thermocouple acting as an actual value sensing element to control said indicator.

14. The device of claim 9, comprising additional switch contacts in the range of the actual value contact for at least one further control signal.

15. A device for amplifying a measured value of a magnitude as represented by the position of an indicator element, for actuating an actual value switching member of a control device comprising a servomotor; a mechanical follow-up assembly connected to be moved by the servomotor and follow any position of the indicator element by movement periodically between two positions one at the momentary position of the indicator element and the other to one side thereof; electrical control means arranged at this follow-up assembly and connected with said servomotor; a shielding element mechanically connected with the indicator element for controlling said electrical control means; and switching elements connected with said follow-up assembly.

16. A device for amplifying energy indicative of a measured value of a parameter for actuating an actual value process control element of a control device, the measured value being represented by the position of an indicator element, comprising, in combination: an indicator element; a servomotor; a mechanical follow-up assembly having an actual value process control element, said follow-up assembly being mechanically connected to said servomotor and being mounted for movement with respect to said indicator element; electrical control means connected to the servomotor and responsive to the position of said follow-up assembly with respect to said indicator element for causing said servomotor to move said follow-up assembly between two positions one at the momentary position of said indicator element and the other to one side thereof; and an adjustable desired value assembly responsive to the position of said actual value process control element of said follow-up assembly for influencing process parameter varying elements in dependence thereon.

References Cited by the Examiner
UNITED STATES PATENTS 2,319,406    5/43    Jones _____ 317—130 X
3,114,089    12/63    Mulligan _____ 318—31

SAMUEL BERNSTEIN, *Primary Examiner.*